(12) United States Patent
Neutra

(10) Patent No.: US 10,959,036 B2
(45) Date of Patent: Mar. 23, 2021

(54) AUGMENTED AUDIO DEVELOPMENT TOOL

(71) Applicant: Bose Corporation, Framingham, MA (US)

(72) Inventor: Matthew Eliot Neutra, Sherborn, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/539,480

(22) Filed: Aug. 13, 2019

(65) Prior Publication Data

US 2021/0051433 A1 Feb. 18, 2021

(51) Int. Cl.
*H04S 7/00* (2006.01)
*G06F 3/01* (2006.01)

(52) U.S. Cl.
CPC .............. *H04S 7/303* (2013.01); *G06F 3/011* (2013.01); *H04S 2400/11* (2013.01)

(58) Field of Classification Search
CPC ... H04S 7/00; H04S 7/30; H04S 7/302; H04S 7/303; H04S 2400/11; G06F 3/01; G06F 3/011; G06F 3/012; G06F 3/017; G06F 3/048; G06F 3/0484; G06F 3/0481; G06F 3/04842; H04N 21/431; H04N 21/482
See application file for complete search history.

(56) References Cited

U.S. PATENT DOCUMENTS

| | | | |
|---|---|---|---|
| 7,631,277 B1* | 12/2009 | Nie | G06T 15/205 345/419 |
| 10,031,655 B2* | 7/2018 | Kim | G11B 27/11 |
| 2009/0015583 A1* | 1/2009 | Starr | G06T 13/205 345/419 |
| 2009/0113305 A1 | 4/2009 | Graif et al. | |
| 2009/0228779 A1* | 9/2009 | Williamson | H04L 67/306 715/233 |
| 2009/0276730 A1* | 11/2009 | Aybes | G06F 9/44521 715/825 |
| 2009/0300679 A1* | 12/2009 | Hiroi | H04L 12/2812 725/40 |
| 2011/0107227 A1* | 5/2011 | Rempell | G06F 8/34 715/738 |

(Continued)

OTHER PUBLICATIONS

Salo et al., "Backend Infrastructure Supporting Audio Augmented Reality and Storytelling," Springer International Publishing Switzerland 2016, International Conference on Human Interface and the Management of Information, 2016, pp. 325-335.

(Continued)

*Primary Examiner* — Thang V Tran
(74) *Attorney, Agent, or Firm* — Hoffman Warnick LLC

(57) ABSTRACT

Various implementations include computing devices and related computer-implemented methods for rendering a scene in an augmented audio environment. Certain implementations include a computer-implemented method including: generating a set of inputs to an application programming interface (API) on a display, the set of inputs including: a media library input; an experience state input for defining a set of experiences; and an event toolbar input for defining transitions between the experiences; and rendering the set of inputs at an audio device to generate a scene in an augmented audio environment.

17 Claims, 10 Drawing Sheets

(56) References Cited

U.S. PATENT DOCUMENTS

| | | |
|---|---|---|
| 2014/0155154 A1* | 6/2014 | Laakkonen ......... G07F 17/3225 |
| | | 463/31 |
| 2015/0100623 A1* | 4/2015 | Gudell ............. H04N 21/43615 |
| | | 709/203 |
| 2015/0133168 A1 | 5/2015 | Jay |
| 2015/0229696 A1* | 8/2015 | Kim .................... H04N 21/485 |
| | | 709/219 |
| 2018/0173388 A1 | 6/2018 | Holmes et al. |
| 2018/0206069 A1 | 7/2018 | Santos |
| 2018/0349700 A1 | 12/2018 | Percuoco et al. |
| 2019/0124401 A1 | 4/2019 | Lentner |
| 2019/0139314 A1 | 5/2019 | Marsh et al. |
| 2019/0243530 A1 | 8/2019 | De Ridder et al. |
| 2020/0111242 A1 | 4/2020 | Gupta et al. |
| 2020/0209952 A1 | 7/2020 | Järvinen et al. |

OTHER PUBLICATIONS

Tsuruoka et al., "An Authoring Tool for Urban Audio Tours with Animated Maps, Dec. 2008, Advances in Computer Entertainment Technology" 2008, Proceedings of the 2008 International Conference on Advances in Computer Entertainment Technology, pp. 330-333.

Walker et al., "Mobile Audio Designs Monkey: An Audio Augmented Reality Designer's Tool," Jul. 6-9, 2005, Proceedings of ICAD 05-Eleventh Meeting of the International Conference on Auditory Display, pp. 1-5.

\* cited by examiner

AUGMENTED AUDIO DEVELOPMENT TOOL

TECHNICAL FIELD

This disclosure generally relates to augmented reality (AR) audio experiences. More particularly, the disclosure relates to devices and related methods for rendering AR audio experiences in audio devices, such as wearable audio devices.

BACKGROUND

Portable electronic devices, including headphones, audio eyeglasses and other wearable audio systems are becoming more commonplace. These portable electronic devices can enable more immersive user experiences, for example, using audio to augment the user's perception of the surrounding world. However, these conventional systems fail to capitalize on the various benefits that augmented audio can provide.

SUMMARY

All examples and features mentioned below can be combined in any technically possible way.

Various implementations include computing devices and related computer-implemented methods for rendering a scene in an augmented audio environment. Certain implementations include approaches for generating application programming interface (API) inputs on a display. Additional implementations include approaches for rendering the API inputs at an audio device.

In some particular aspects, a computer-implemented method includes: generating a set of inputs to an application programming interface (API) on a display, the set of inputs including: a media library input; an experience state input for defining a set of experiences; and an event toolbar input for defining transitions between the experiences. The method further includes rendering the set of inputs at an audio device to generate a scene in an augmented audio environment.

In other particular aspects, a computing device for rendering a scene in an augmented audio environment includes: a display; a processor to execute instructions; and a memory coupled with the processor to store the instructions, which when executed by the processor, cause the processor to perform operations to generate a set of inputs to an application programming interface (API) on the display, the set of inputs including: a media library input; an experience state input; and an event toolbar input, where the scene is rendered at an audio device based upon the set of inputs in response to user actuation.

Implementations may include one of the following features, or any combination thereof.

In some cases, the media library input includes audio content selections for playback in the scene.

In particular aspects, the experience state input includes a triggering event input defining a triggering event for the scene and/or at least one of the experiences in the scene, where in response to the triggering event an API-calling component renders audio playback of at least one of the audio content selections.

In certain implementations, the triggering event includes a plurality of required sub-events that are required to trigger the scene, or a particular experience in the scene.

In some cases, the event toolbar input includes at least one of user interaction correlations or event class correlations with a type of augmented audio hardware providing a data input.

In particular implementations, the event toolbar input enables a user to define the type of augmented audio hardware that is configured to initiate the transition between the experiences.

In certain aspects, the experience state input includes a relative experience input comprising at least one of: a) a user centered experience, where audio is rendered in the augmented audio environment with a user as a central point regardless of movement of the user; b) a room scale experience, where audio is rendered in the augmented audio environment with adjusted dimensionality as the user moves; c) a distance triggered experience, where upon triggering, the audio is rendered in the augmented audio environment based solely upon a distance the user has traveled; or d) a time triggered experience, where upon triggering, the audio is rendered in the augmented audio environment based solely upon an elapsed time.

In some cases, the experience state input includes an absolute experience input for defining a geographic element in physical space, where the scene is rendered in the augmented audio environment in response to user movement relative to the geographic element.

In particular aspects, the geographic element is displayed in a map workspace on the API and comprises at least one of a point, a line or a polygon.

In certain implementations, the geographic element is actuatable in the API, and in response to actuating the geographic element, the API displays a properties dialog box indicating characteristics of the geographic element in the scene.

In some cases, the media library input includes a plurality of inputs associated with distinct types of audio content selections for rendering in the scene.

In particular implementations, the plurality of inputs include two or more of: voice audio content, musical audio content, ambiance audio content, or sound effect audio content, and where the API permits assigning the two or more inputs to distinct locations relative to the user in physical space.

In certain cases, the experience state input is displayed in the API as a set of template experiences assignable to the scene.

In some aspects, the media library input includes options for assigning at least one audio file to the scene, where the at least one audio file includes a spatialized audio file configured for binaural playback, a monaural audio file or a stereo audio file.

In particular implementations, the API allows an API-calling component to render audio playback at the audio device according to the set of inputs.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
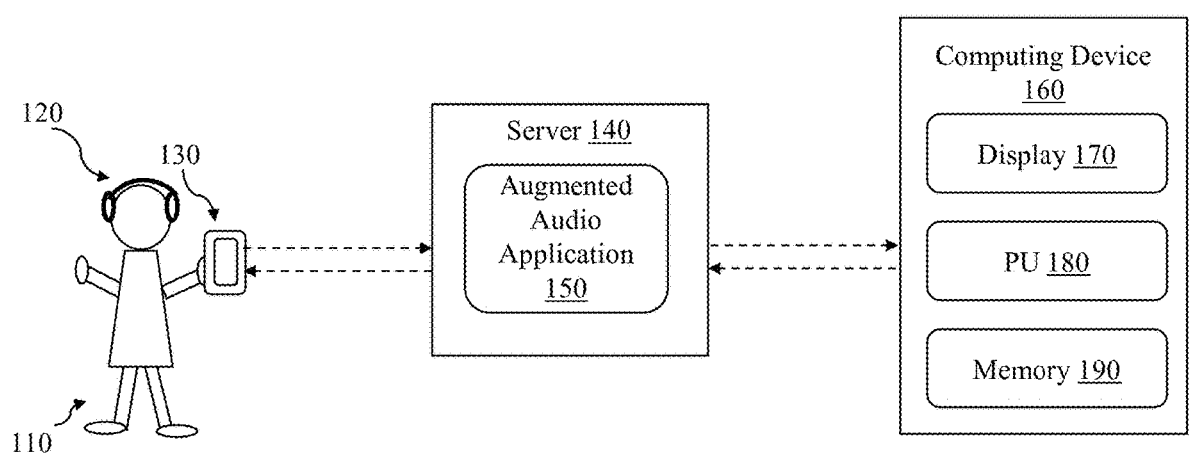
FIG. 1 is a data flow diagram illustrating interaction between devices in an environment according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a scene in an augmented audio environment can be rendered based upon application programming interface (API) inputs, e.g., from a developer. Certain implementations include approaches for generating application programming interface (API) inputs on a display. Additional implementations include approaches for rendering the API inputs at an audio device.

As noted herein, conventional interfaces for developing augmented reality (AR) audio experiences are designed for professional programmers with significant experience in one or more programming languages. These interfaces limit the number and type of developers that can contribute to AR audio platforms, and consequently, limit the end-user experience. In contrast to these conventional approaches, various implementations include approaches for generating and rendering API inputs with an intuitive, user-friendly interface. As compared with conventional approaches, these approaches disclosed according to various implementations can broaden the pool of potential developers for an AR audio platform, as well as enhance AR audio features in particular experiences.

Commonly labeled components in the FIGURES are considered to be substantially equivalent components for the purposes of illustration, and redundant discussion of those components is omitted for clarity.

Various implementations include a computing device for rendering a scene in an augmented audio environment. FIG. 1 illustrates an example environment 100, including a user 110 and an audio device 120. While the audio device 120 is illustrated in this example as a wearable audio device (e.g., headphones, earphones, audio glasses, open-ear audio devices, shoulder-worn speakers or wearable speakers), the audio device 120 can include any conventional audio device such as a portable speaker, smart speaker, etc. In some implementations, the audio device 120 is connected with a smart device 130. However, in other implementations, the audio device 120 can have integrated smart device capabilities (e.g., communications and data processing), such that a distinct smart device 130 is not necessary to perform functions described herein.

In particular cases, the smart device 130 includes a smart phone, smart watch or other wearable smart device, portable computing device, etc., and has an audio gateway, processing components, and one or more wireless transceivers for communicating with other devices in the environment 100. For example, the wireless transceiver(s) can be used to communicate with the audio device 120, as well as one or more connected smart devices within communications range. The wireless transceivers can also be used to communicate with a server 140 hosting a mobile application that is running on the smart device 130, for example, an augmented audio application 150. The server 140 can include a cloud-based server, a local server or any combination of local and distributed computing components capable of executing functions described herein. In various particular implementations, the server 140 is a cloud-based server configured to host the augmented audio application 150, e.g., running on the smart device 130. According to some implementations, the augmented audio application 150 is downloaded to the user's smart device 130 in order to enable functions described herein.

In certain cases, the server 140 is connected with a computing device 160 that enables coding of the augmented audio application 150, e.g., by a software developer or other programmer. In some example implementations, the computing device 160 is the same device as the smart device 130, and/or is an integral device within the smart device 130. In other example implementations, the computing device 160 is a device that is distinct from the smart device 130. In additional example implementations, the computing device 160 can include a cloud-based computing system that is accessible via a smart device (e.g., smart device 130) or other local computing device, e.g., via a web browser. In various implementations, the computing device 160 includes a display 170. In certain implementations, the display 170 includes a user interface such as a touch screen, graphical user interface or other visual interface. In cases where the computing device 160 is a smart device such as a smartphone or tablet, the display 170 includes the screen on that smart device. In other cases, the computing device 160 can include a PC, a smart television, a surface computing machine, etc., and the display 170 can be a separate physical device such as a monitor or projection screen. The computing device 160 can also include a processor (PU) 180 to execute instructions for generating a set of inputs to an application programming interface (API) on the display 170. In some cases, a memory 190 is coupled with the processor (PU) 180 to store the instructions. In other implementations, the processor 180 can otherwise access the instructions, e.g., from a remote storage system connected with the computing device 160. When executed by the processor 180, the instructions cause the processor 180 to generate a set of inputs to the API, as shown on the display 170.

The memory 190 can include, for example, flash memory and/or non-volatile random access memory (NVRAM). In some implementations, instructions (e.g., software) are stored in an information carrier. The instructions, when executed by one or more processing devices (e.g., the processor 180), perform one or more processes, such as those described elsewhere herein. The instructions can also be stored by one or more storage devices, such as one or more (e.g. non-transitory) computer- or machine-readable mediums (for example, the memory, or memory on the processor). As described herein, the memory 190 can include instructions, or the processor 180 can otherwise access instructions for generating API inputs on a display (for an augmented audio environment) according to various particular implementations. It is understood that portions of the memory (e.g., instructions) can also be stored in a remote location or in a distributed location, and can be fetched or otherwise obtained by the processor 180 (e.g., via any communications protocol described herein) for execution.

Figure 2:
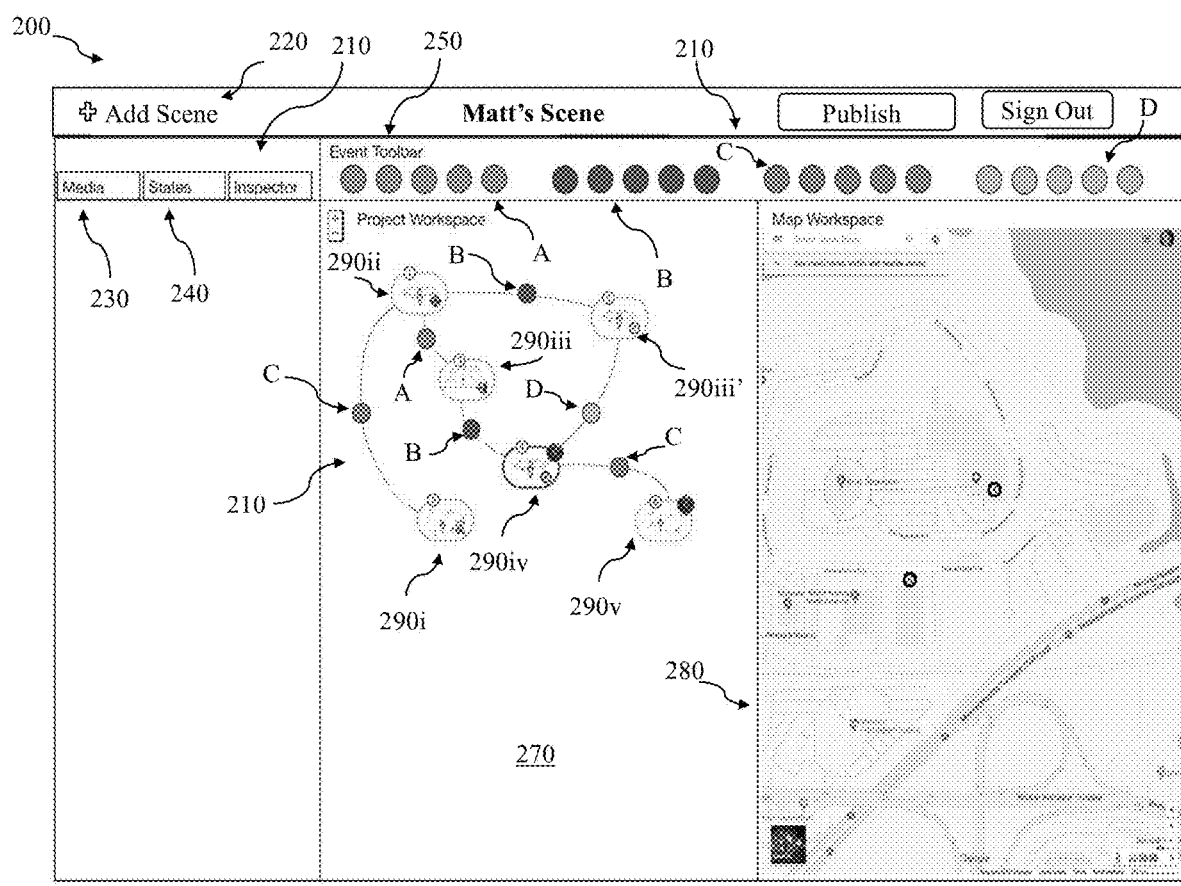
FIG. 2 is a schematic depiction of an example interface for providing inputs to an API according to various implementations.

FIG. 2 is a schematic depiction of an example interface (e.g., graphical user interface) 200 displaying inputs 210 to an API for rendering a scene in an augmented audio environment. According to various implementations, the interface 200 is rendered at the display 170 (FIG. 1), and provides the programmer (or, software developer) with inputs 210 used by the API to render a scene in an augmented audio environment. In particular cases, the API uses the inputs 210 to render audio playback at the audio device 120 worn by the user 110 (FIG. 1).

As described herein, a "scene" is a set of augmented audio experiences (also called "states") that are rendered as playback at an audio device (e.g., audio device 120). The audio playback can be related to the geographic location of a user, orientation of that user, the proximity of the user to other users or other locations, etc. Experiences (or, states) are initiated by events, which may be referred to as "triggering events." Transitions between experiences can also be defined by events. As noted herein, various implementations allow a programmer/user to create a scene that includes a set of (e.g., two or more) augmented audio experiences that can be triggered based upon a corresponding set of events. While in a given experience, audio playback is rendered at the user's audio device, and when a triggering event is detected, the audio playback is modified (e.g., a different file or stream is played, playback is stopped or paused, or the spatialized nature of the playback is adjusted) as the user transitions to another experience. The various implementations described herein permit the programmer/user to define a scene using these experiences and events.

Returning to FIG. 2, the programmer can create a scene by clicking or otherwise actuating an option on a scene selection menu 220. In certain cases, the scene selection menu 220 allows the programmer to add scenes and/or switch between scenes for editing. In some implementations, scenes are assigned ownership rights, or are editable only by select programmers, and as such, are not available for editing by all programmers. In additional implementations, scenes can be edited by multiple programmers. The example of "Matt's Scene" is depicted in FIG. 2.

After selecting a scene from the scene selection menu 220, the programmer can add and/or edit inputs 210 to the API. In some cases, inputs 210 can include: a media library input 230, an experience state input 240 for defining a set of experiences, and an event toolbar input 250 for defining transitions between the experiences.

In various implementations, the media library input 230 enables a programmer to assign a media content selection for playback in the scene. In particular cases, the media library input 230 includes audio content selections for playback in the scene. For example, the media library input 230 can enable the programmer to assign audio content selections such as voice audio content, musical audio content, ambiance audio content and/or sound effect (SFX) audio content to a given scene. In particular cases, the media library input 230 includes options for assigning at least one audio file to a scene. The audio file can include a spatialized audio file configured for binaural playback, a monaural audio file, or a stereo audio file. Additional aspects of assigning media library inputs 230 are described with reference to the example depictions of interfaces in FIGS. 3-8.

In various implementations, the experience state input 240 includes a triggering event input defining a triggering event for the scene and/or for particular experiences within the scene. In response to the triggering event, an API-calling component is configured to render audio playback of the audio content selection(s) from the media library input 230 (e.g., at the transducers on the audio device 120 and/or smart device 130). In some cases, as described herein with respect to the example depictions of interfaces in FIGS. 3-8, the triggering event can include a plurality of required sub-events that are required to trigger the scene or a particular experience within the scene.

In various implementations, the event toolbar input 250 enables a user (e.g., programmer) to define the type of augmented audio hardware that is configured to initiate the transition between experiences. In particular cases, the event toolbar input 250 can include event class correlations with a type of augmented audio hardware providing a data input (e.g., audio device 120, smart device 130, etc.). In additional cases, the event toolbar input 250 can include user interaction correlations with the audio hardware for triggering a transition between the experiences. For example, the event toolbar input 250 can include grouped or otherwise delineated types of user interaction or event class correlations with a type of augmented audio hardware providing a data input.

In a particular example illustrated in interface 200, the event toolbar input 250 includes indicators (e.g., dots) in groupings A, B, C and D. In these cases, the indicators in group A can represent a type of user interaction or event that is detectable by augmented audio hardware providing a data input (e.g., audio device 120, smart device 130, etc.). The indicators in groups B, C and D can represent respective different types of user interaction or event detectable by the augmented audio hardware. For example, group A indicators can represent user interaction or detectable events with a wearable device such as a wearable audio device 120 (e.g., headphones, audio glasses, etc.). These indicators can include a double-tap on a tactile interface, a head nod or head shake as detected by an inertial measurement unit (IMU), an iBeacon signal as detected by a location tracking system, a network message from a local area network (LAN) or Wi-Fi network, a mobile device input, a near field communication (NFC) device signal, a cadence reading, etc. Indicators in group B can represent user interaction or detectable events with a smart device (e.g., smart device 130), such as a button press, swipe or tap on a touch screen, an orientation change as detected by an on-board IMU, etc. Indicators in groups C and/or D can represent user interaction or detectable events or conditions as detected by an external sensor such as a GPS, e.g., in a mobile device, or other sensors in, e.g., a fitness tracker, a smart watch, etc.

An inspector input 260 is also illustrated in interface 200, which can include information and parameters related to an experience (or, state) containing media or an event triggering the transition from one state to another. An example of such information can include the name of the state. An example of a parameter can include data related to a triggering event like latitude and longitude readings describing a geographic trigger, or the unique ID of a geographic beacon (e.g., an iBeacon) trigger.

Interface 200 also shows a project workspace 270, which can permit the user (e.g., programmer) to click-and-drag, slide, drop, insert or otherwise manipulate inputs 210 within a mockup of the scene. The interface 200 can also include a map workspace 280, which allows the user (e.g., programmer) to locate scenes, as well as particular experiences within those scenes, in geographic space, e.g., in a map of a location or region.

Experiences 290 can be defined by the triggering events that initiate each experience (e.g., selectable from event toolbar 250), as well as the media library input 230 selected for the corresponding experience 290. The project workspace 270 in FIG. 2 helps illustrate a series of events 290*i-v* that can be triggered by different triggering events. For example, an initial experience 290*i* in a scene can be initiated in response to a power cycle of the audio device 120, detecting that the audio device 120 has entered a geographic region, or a user interface command at the audio device 120 (e.g., a voice command or tactile command by the user). When initial experience 290*i* is triggered the augmented audio application 150 is configured to initiate audio playback of one or more audio content selections (from the media library input 230) assigned to that experience 290*i*. In certain cases, these audio content selections can include spatialized audio files or streams, and in various implementations, can include multiple channels.

Satisfaction of one or more triggering events can be detected with data obtained from one or more applications running on the smart device 130 and/or sensors on the audio device 120 and/or the smart device 130 and/or external devices (e.g., fitness tracker, smart watch, etc.). This data can include one or more of: clock data indicating a current time of day, location type data indicating a type of geographic location proximate the audio device 120, demographic data indicating at least one demographic attribute of the geographic location proximate the audio device 120, weather data indicating a weather condition proximate the audio device 120, speed data indicating a speed at which the audio device 120 is moving, relative location data indicating the audio device 120 is proximate to a plurality of additional audio devices associated with corresponding users executing a common application on the audio device 120 or a paired audio gateway (e.g., at smart device 130), celestial event data indicating a current or impending celestial event, current event data indicating a breaking news story, a new release of a product, or a new release of an artistic work, application execution data for an application executing on the audio device 120 or a paired audio gateway (e.g., at smart device 130), or data indicating proximity to an additional audio device associated with an additional user executing a common application. Additional details of triggering events (also referred to as augmented audio conditions) and how such events (or, conditions) can be detected in order to render an augmented audio environment are described in U.S. patent application Ser. No. 16/289,940 ("Augmented Reality Audio Playback Control"), filed on Mar. 1, 2019 and herein incorporated by reference in its entirety.

In various implementations, the event toolbar inputs 250 can be inserted into the project workspace 270 to connect two experiences, e.g., experiences 290*i* and 290*ii*, or 290*ii* and each of 290*iii* and/or 290*iii'*. That is, the event toolbar inputs 250 allow the user to define a triggering event (e.g., as defined by event type(s) and corresponding hardware triggers A-D) that will initiate a transition between experiences 290. In the example depicted in FIG. 2, the interface 200 shows an event C triggering a transition from experience 290*i* to experience 290*ii*. The interface 200 also shows event A triggering a transition from experience 290*ii* to experience 290*iii*, and event B triggering a transition from experience 290*ii* to experience 290*iii'*. As noted herein, when the augmented audio application 150 detects an event associated with a transition between experiences (e.g., event B or event A while in experience 290*ii*), the augmented audio application 150 can adjust the audio output at the audio device 120 according to the attributes of the next experience (e.g., 290*iii* or 290*iii'*). In some cases, as noted herein, each triggering event (e.g., event B or event A) can include a plurality of required sub-events that are required to trigger the scene, or a particular experience within the scene. For example, each sub-event can include a distinct user interaction correlation or event class correlation with a type of augmented audio hardware. In a particular example, sub-events can include interactions with the audio device 120 (e.g., double-tap of a tactile interface, nodding as detected by an IMU, voice command as detected by microphone(s)) as well as interactions with the smart device 130 (e.g., GPS signal indicates the smart device is in a particular region, or the augmented audio application 150 is open on the smart device. In various implementations, based upon which triggering event(s) are detected, the augmented audio application 150 will initiate a transition from the current experience (or, state) to a distinct experience (e.g., where event A triggers a transition from experience 290*ii* to 290*iii* as compared with event B, which triggers a transition from experience 290*ii* to 290*iii'*). That is, these triggering events can determine the nature of the transition from one state to another.

Figure 3:
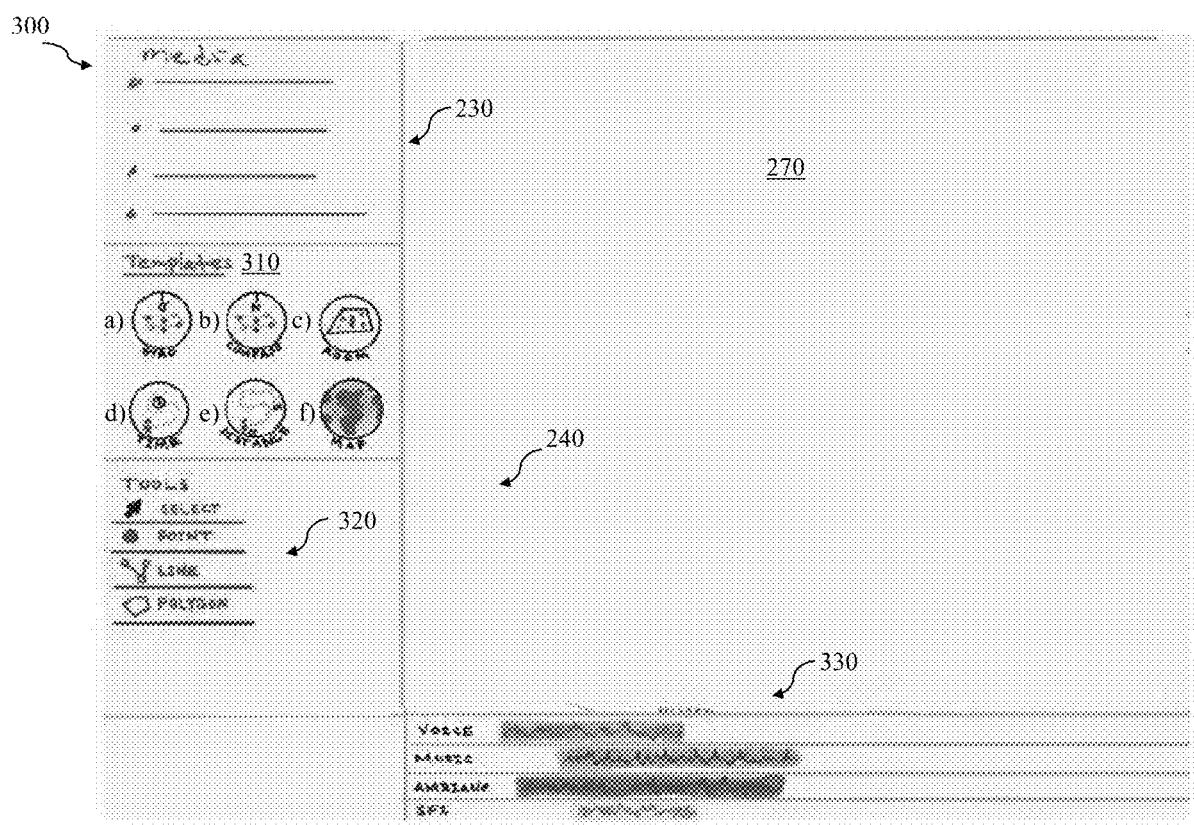
FIG. 3 shows a portion of the interface from FIG. 2, further depicting sub-inputs to the API according to various implementations.

FIG. 3 illustrates an additional example of a sub-interface 300, that can be part of the general interface 200 depicted in FIG. 2, or a variation on that general interface 200 (e.g., after selecting media input tab and experience state tab and prior to initiating the map workspace 280). This interface 300 can include some features present in the interface 200 depicted in FIG. 2, e.g., a workspace 270 and media library input(s) 230. In some implementations, the experience state input 240 is shown including a template selection input 310, a tool selection menu 320, and an audio channel selection input 330.

In some cases, the template selection input 310 includes a plurality of template experiences (a)-(f) that are assignable to the scene. Example template experiences (a)-(f) depicted can include: a) Gyro, b) Compass, c) Room, d) Time, e) Distance and f) Map. In various implementations, the experience state input 240 can include two types of experience inputs: i) relative experience inputs; and ii) absolute experience inputs. In some cases, relative experience inputs are used to define relative experiences that can be triggered regardless of the geographic location of the audio device 120 (and/or smart device 130). These relative experience inputs include: a) Gyro, b) Compass, c) Room, d) Time and e) Distance. Absolute experience inputs enable the user to add geographic location ((f) Map) to one or more of the relative experience inputs. That is, after defining a relative experience in terms of inputs from the media selection input(s) 230 and experience state input(s) 240, the user can designate the experience at a geographic location using the template input 310 for f) Map. Relative experience inputs can include one or more of the following:

a) User centered experience (or, state), where audio is rendered in the augmented audio environment with a user (e.g., user 110, FIG. 1) as a central point regardless of movement of the user. Templates a) Gyro and b) Compass can be selected to define a user centered experience in various implementations. In these cases, the audio playback at the audio device 120 remains spatially static with respect to the user 110 as he/she moves. That is, a source that appears to come from a direction and distance relative to the user will appear to remain at that direction and distance even as the user moves in the physical environment (e.g., walks, runs, drives, etc.).

b) Room scale experience, where audio is rendered in the augmented audio environment with adjusted dimensionality as the user (e.g., user 110, FIG. 1) moves. In these cases, the audio playback at the audio device 120 adjusts in terms of dimensionality as the user moves within the physical environment. That is, a source that appears to come from a direction and distance relative to the user will appear closer, farther and/or from a distinct direction as the user moves within the physical environment.

c) Distance triggered experience, where upon triggering, the audio is rendered in the augmented audio environment based solely upon a distance the user has traveled. Template e) Distance can be selected to define a distance triggered experience in various implementations. In these cases, as the user 110 travels (e.g., walks, bicycles, runs, etc.), the audio playback at audio device 120 will adjust (e.g., in terms of media source, directionality, number and/or types of sources, etc.) based solely upon the quantity of distance traveled, e.g., where audio playback changes at distance D, and then again at distance 2D, or distance D+X.

d) Time triggered experience, where upon triggering, the audio is rendered in the augmented audio environment based solely upon an elapsed time. Template d) Time can be selected to define a time triggered experience in various implementations. In these cases, as time passes, the audio playback at audio device 120 will adjust (e.g., in terms of media source, directionality, number and/or types of sources, etc.) based solely upon the quantity of time elapsed, e.g., where audio playback changes at time t, and then again at time 2t, or time t+x.

Figure 4:
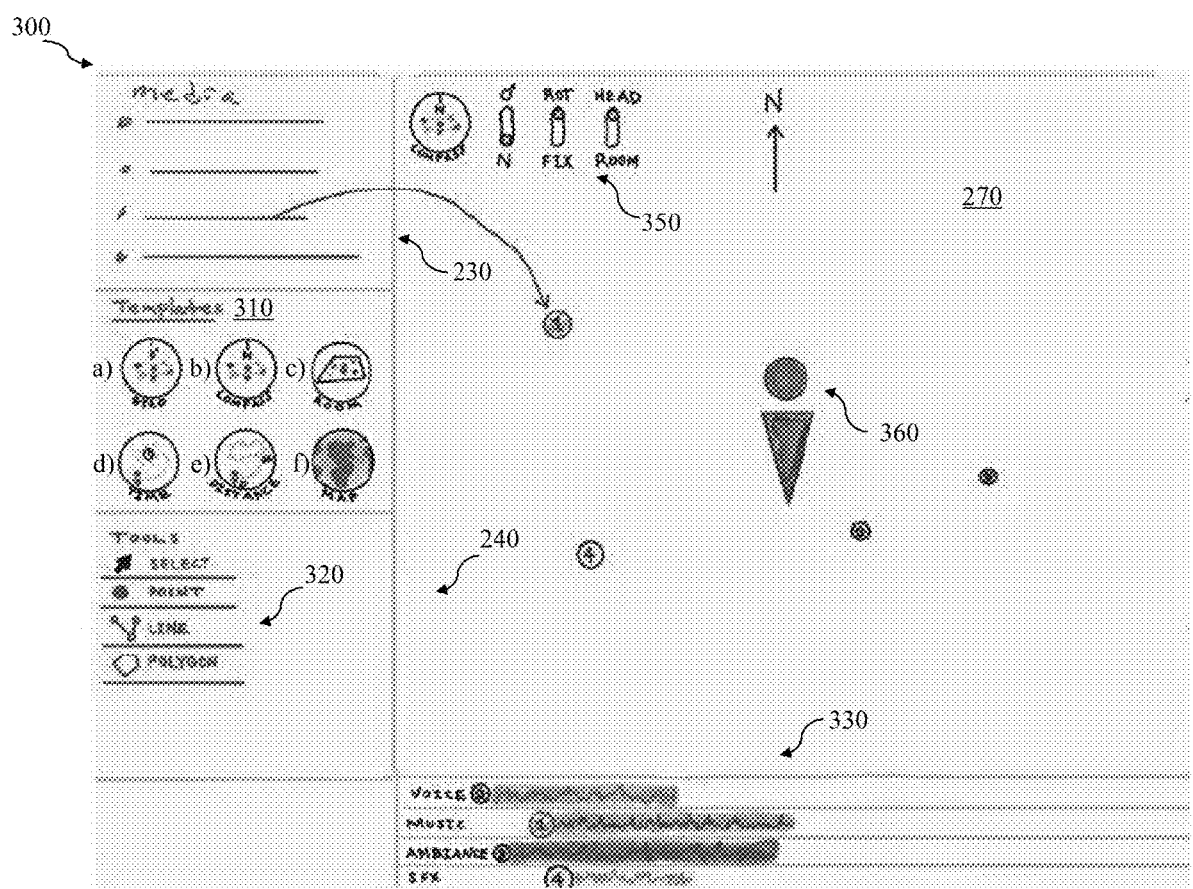
FIG. 4 shows additional portions of the interface from FIG. 2, depicting additional inputs to the API according to various implementations.
Figure 5:
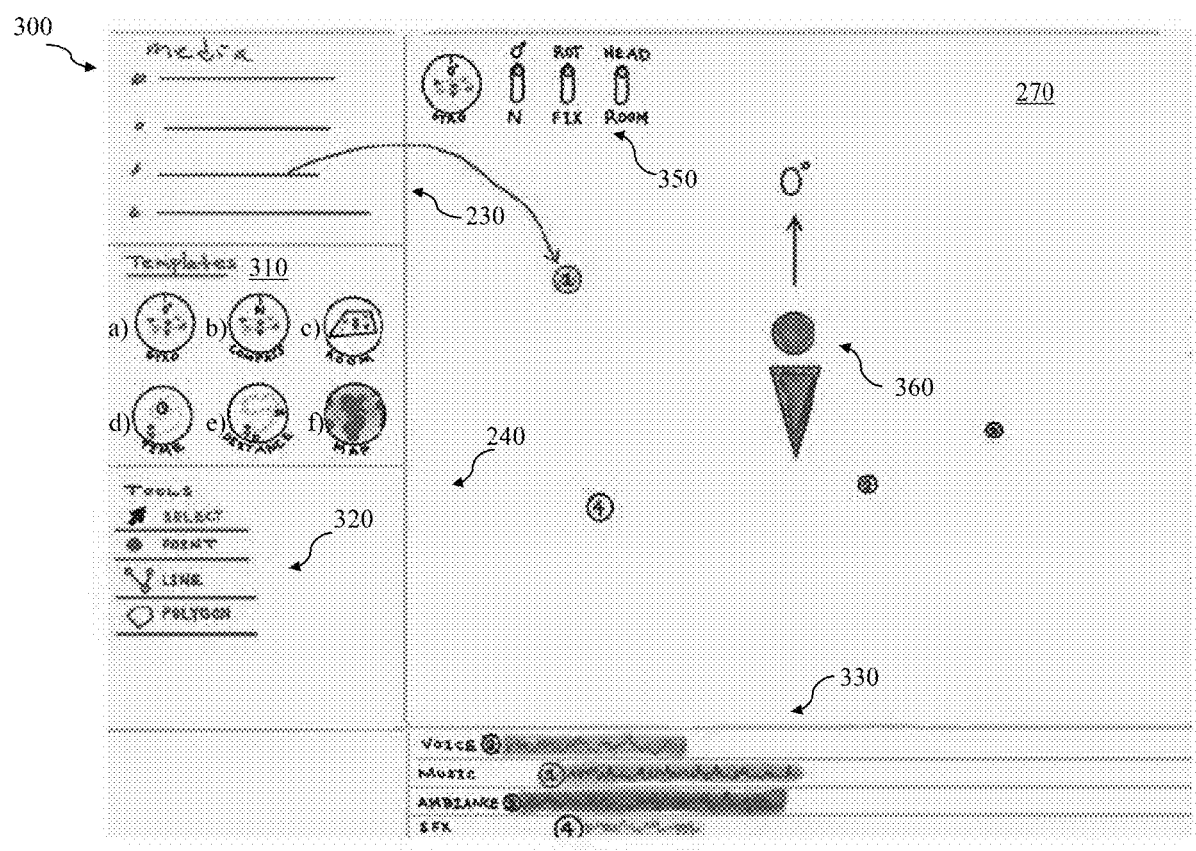
FIG. 5 shows further portions of the interface from FIG. 2, depicting additional inputs to the API according to various implementations.

Templates 310 can be inserted (e.g., clicked-and-dragged, selected, highlighted, etc.) into the workspace 270 to define the experience(s). For example, FIG. 4 shows b) Compass template inserted into the workspace 270, which can also trigger additional inputs 350, e.g., orientation (zero degrees (absolute North) v. N (relative North)), rotation v. fixed, head v. room scale. In response to inserting a template 310 into the workspace 270, the augmented audio application 150 is configured to populate the workspace 270 with corresponding additional inputs 350 that enable the user/programmer to further define each experience. In another example, FIG. 5 shows a) Gyro template inserted into the workspace 270, triggering additional inputs 350 similar to those shown with respect to b) Compass. In the Gyro template, orientation is set to absolute North (0°), while in the Compass template, orientation is set to relative north (N).

FIGS. 3-5 illustrate a plurality of media library inputs 230, which can include media (e.g., audio) files, streams or other sources of media content (e.g., voice audio content, musical audio content, ambiance audio content, or sound effect audio content) configured for playback at the audio device 120. In various implementations, the media library input 230 includes a menu that is linked with a file library or a listing of available audio streams that can be assigned to one or more experiences and/or scenes via the API. In various implementations, files are selected from a list of user uploaded and/or default audio files. As noted herein, files can be assigned by heading (also referred to as user look direction) in order to trigger distinct audio playback of files.

It is understood that where the term "file" (e.g., audio file) is used in this disclosure, the term "stream" (e.g., audio stream) can be equally applicable.

In certain cases, the audio file includes a spatialized audio file configured for playback (which in some examples is binaural). In these cases, the audio file is configured for output at a spatially rendered audio location, or multiple spatially rendered audio locations, relative to the user 110 (FIG. 1). For example, the spatialized audio file can be configured for playback at one or more spatially rendered audio locations relative to the user's look direction (e.g., as detected by sensors on the audio device 120 and/or smart device 130), or relative to a physical location proximate the user 110 (FIG. 1). In other cases, the audio file includes a monaural audio file, a stereo audio file, or a multichannel audio file.

According to some implementations, the augmented audio application 150 (FIG. 1) can provide information to the API about the capabilities of the audio device 120, and tailor the selection options for the media library input 230 accordingly. That is, where the augmented audio application 150 detects that the audio device 120 is a head or shoulder-worn speaker system that can benefit from binaural playback, the augmented audio application 150 can filter options in the media library input 230 to include spatialized audio files. In other cases, where the augmented audio application 150 detects that the audio device 120 is a portable speaker system that may not benefit from binaural playback, the augmented audio application 150 can filter options in the media library input 230 to exclude spatialized audio files, or prioritize monaural audio files, stereo audio files, or a multichannel audio files.

In certain cases, the audio file(s) can include one or more of a narrative audio file (e.g., introducing content) and an interactive audio file (e.g., for playback in response to a user action). Additional description of narrative audio files and interactive audio files is included in U.S. patent application Ser. No. 16/289,932 ("Augmented Audio Development"), filed on Mar. 1, 2019, and herein incorporated by reference in its entirety.

Returning to FIG. 3, but with additional reference to FIGS. 4 and 5, the interface 300 permits assigning two or more of the media library inputs 230 to distinct locations relative to the user (with depiction of user indicated as 360). In various implementations, the interface 300 permits assigning inputs (e.g., two or more of voice audio content, musical audio content, ambiance audio content, or sound effect audio content) to distinct locations relative to the user in physical space. FIGS. 4 and 5 illustrate how distinct inputs (e.g., files or streams) can be assigned to distinct locations relative to the user. For example, in FIG. 4, a first media library input (1) is inserted into the workspace 270 at a location relative to the user 360 (e.g., northwest of the user), a second media library input (2) is inserted in the workspace 270 at a distinct location relative to the user 360 (e.g., due east of the user), a third media library input (3) is inserted in the workspace 270 at another distinct location relative to the user 360 (e.g., southeast of the user), and a fourth media library input (4) is inserted in the workspace 270 at another distinct location relative to the user 360 (e.g., southwest of the user). The audio channel selection input 330 enables the programmer to assign each of the distinct inputs (1)-(4) to distinct channels for playback, e.g., as spatialized audio. As depicted in this example, input (2) is designated as voice, input (1) is designated as music, input (3) is designated as ambiance (or, background), and input (4) is designated as special effects (SFX). These inputs (1)-(4)

can be mixed (e.g., up-mixed) in some implementations, and/or can be played in distinct times to render characteristics of the augmented audio experience at the audio device 120. In particular cases, the augmented audio application 150 renders these inputs (1)-(4) as spatialized audio, such that the user 110 hears playback of these distinct inputs (1)-(4) at the audio device 120 as though that playback originated from the relative location (e.g., direction and distance) indicated in the workspace 270.

Figure 6:
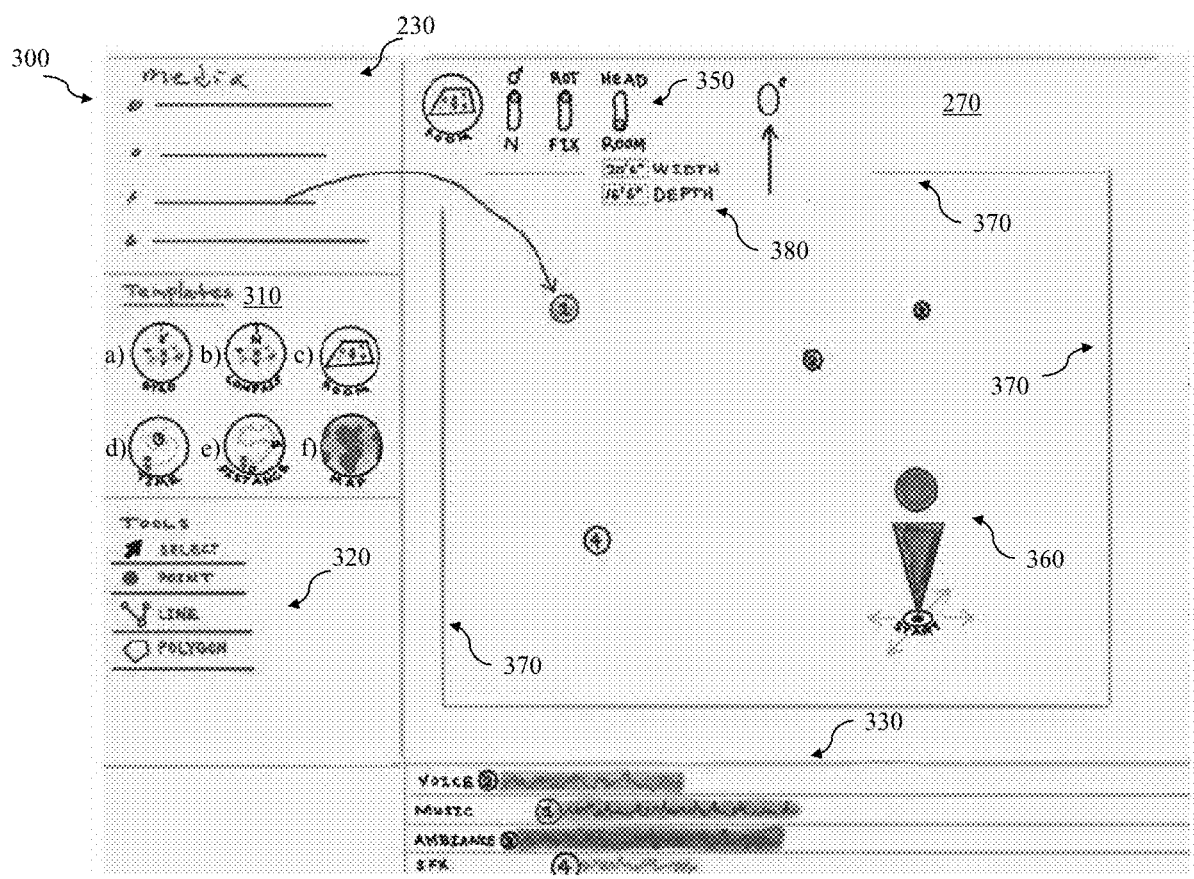
FIG. 6 shows still further portions of the interface from FIG. 2, depicting additional inputs to the API according to various implementations.

FIG. 6 illustrates another example template c) Room, whereby the augmented audio application 150 permits the programmer to define the size of a room, e.g., including depictions of walls 370 and a dimensional indicator 380 (e.g., including width and depth of the room). In Room mode, the programmer can adjust the position of the user 360 within the room, as outlined by the walls 370. During playback, walls 370 will have acoustic properties that mimic a physical wall, such that echo and damping effects are present as a result of the walls 370. For example, a large room may have significantly higher echo effects than a smaller room. As shown in the additional inputs 350, Room mode defaults to "room" setting as compared with "head" setting in Gyro or Compass modes. In a particular example, the Room template defines a room of fixed dimension which the user can walk around in order to hear the distinct input sources (1)-(4). In these cases, as the user approaches an input source (e.g., a particular source such as a recording of a musician in a string quartet), that source appears closer, while other input sources (e.g., distinct musicians in the quartet) appear farther away.

Figure 7:
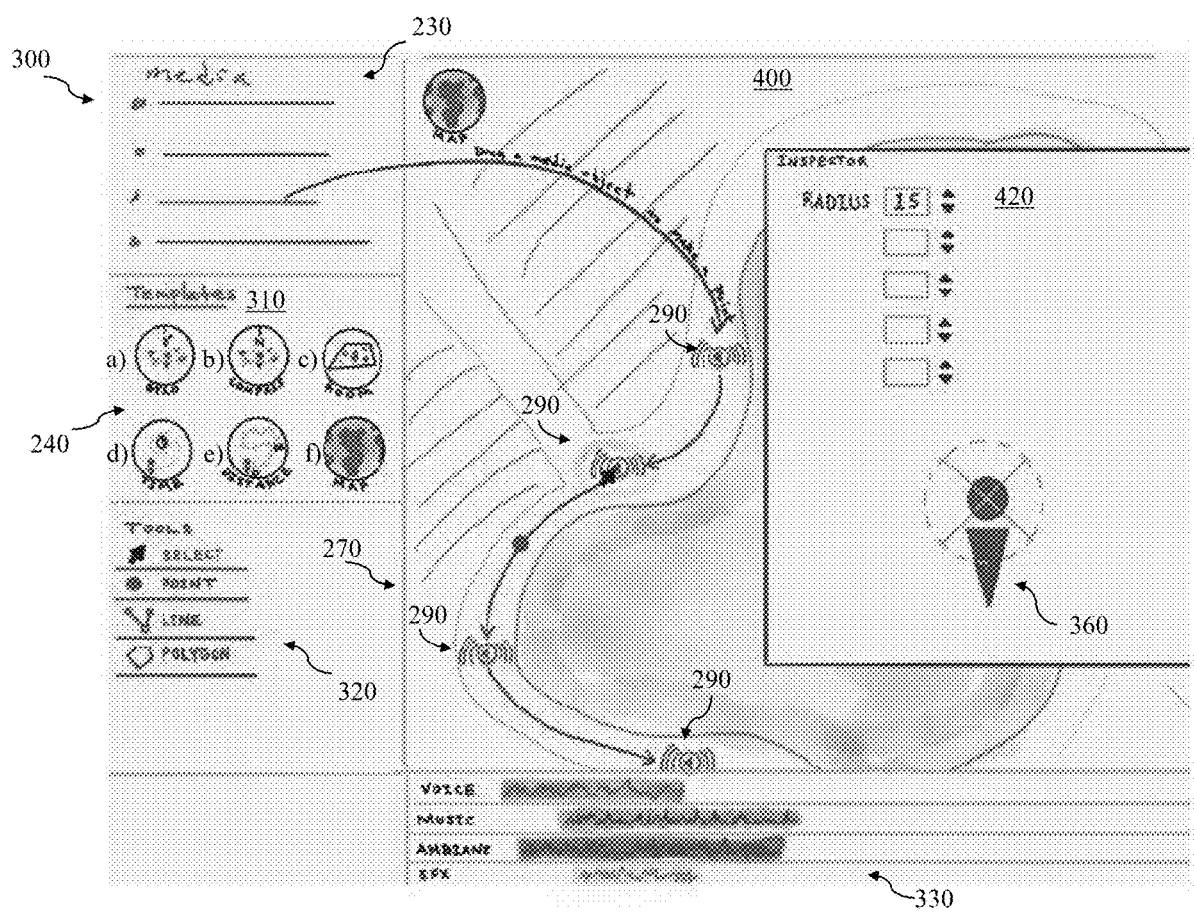
FIG. 7 shows a map portion of the interface from FIG. 2, depicting additional inputs to the API according to various implementations.

FIG. 7 illustrates use of an absolute experience input, such as f) Map template. This absolute experience input (e.g., Map template) can be used to define a geographic element in physical space, e.g., on a map 400. In various implementations, the scene is rendered in the augmented audio environment (e.g., audio playback is initiated) in response to user movement relative to the geographic element, e.g., by entering or exiting a geographic region, or moving within the geographic region.

In some cases, the interface 300 allows the programmer to assign an experience (e.g., experiences 290) to a geographic location (e.g., a specific GPS location) and/or to a location relative to the user (e.g., a relative direction with respect to the user, such as a point north, west, etc. of the user). In various implementations, the user heading is determined based upon the orientation of the audio device 120 when the augmented audio application 150 is initiated. In certain cases, this user heading is considered "relative North" for the purposes of determining relative location and assignment of orientation-specific audio. The example absolute experience input depicted includes a map display 400 that is adjustable to permit selection of one or more locations on a map for assigning the experiences 290. The map display 400 is merely one example display format for assigning experiences 290, which can alternatively, or additionally, include coordinate entries, relative position/direction designations, landmark-based location identification, text-based entries, etc. As noted above, changes in the orientation of file selection inputs relative to N can be reflected in the interface 300, e.g., such that map display 400 rotates, tilts or otherwise moves (e.g., shifts) to correspond with a change in the orientation of N.

Figure 8:
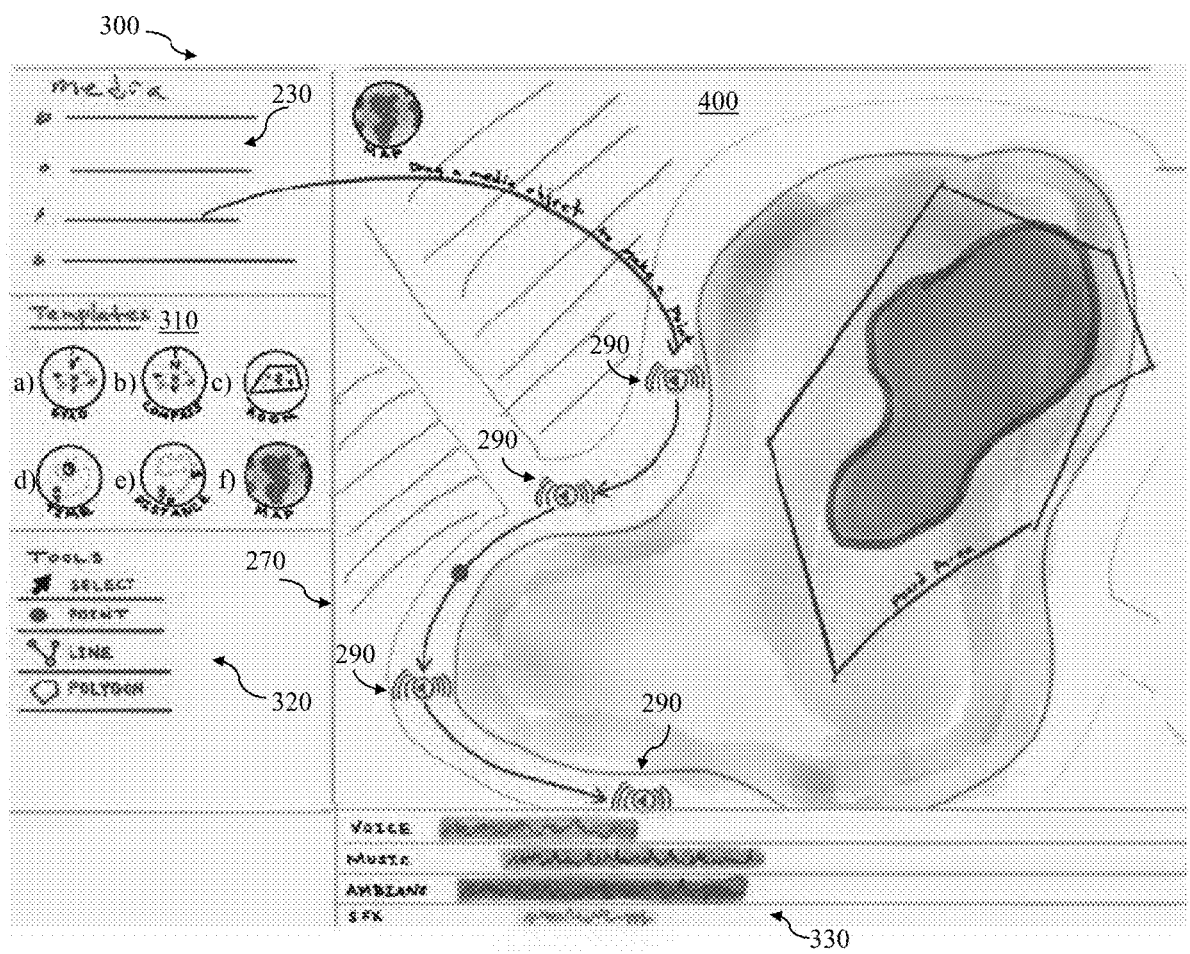
FIG. 8 shows additional details of the map depiction in FIG. 7.

As noted herein, absolute experience inputs allow the programmer to assign each experience 290 (FIG. 2), e.g., as defined in the interface 300 depictions in FIGS. 4-6, to a geographic location on a map. In some cases, in particular when absolute experience inputs such as f) Map is selected, the augmented audio application 150 activates the tool selection input 320 to enable the programmer to select features on the map 400, or insert one or more geographic elements on the map 400. For example, the geographic element(s) can include a point, a line and/or a polygon. FIG. 8 illustrates one example where the augmented audio application 150 enables the programmer to insert a point, line and/or polygon into the map 400 to define a geographic element (polygon defining Pond Area). In some cases, geographic elements can be actuatable in the interface 300, such that in response to actuating the geographic element, the interface 400 displays a properties dialog box 420 (FIG. 7) indicating characteristics of the geographic element in the experience and/or scene. In some cases, the properties dialog box 420 can indicate dimensions of a geographic element (e.g., the Pond Area in FIG. 8), or radius of the experience 290 (e.g., Radius input in FIG. 7), enabling the programmer to adjust the dimensions (e.g., width, length, radius) of each geographic element. In some cases, as shown in the properties dialog box 420 in FIG. 7, a radius selection input can define the radius around a particular location at which the user can trigger the experience associated with augmented audio playback. In certain implementations, the radius selection input includes a dialog box, slider or other actuatable control for adjusting the radius around a particular location for triggering the augmented audio playback.

As noted herein, a programmer can use the interfaces 200, 300 to assign additional inputs 210 to additional experiences in the augmented audio scene. In various implementations, the programmer can interact with the interface 200 to assign inputs 210 to a plurality of experiences in an augmented audio scene, e.g., based upon one or more of geographic location, type of location, user identification characteristics, user travel patterns, proximity to other users, density of users in an area, type of audio device, etc.

In any case, the augmented audio application 150 (FIG. 1) is configured to render the scene in the augmented audio environment based upon the set of inputs 210 (FIG. 2), for example, in response to user actuation at the audio device 120. In particular implementations, the augmented audio application 150 is configured to generate an augmented audio environment by rendering one or more scenes based upon the inputs 210. Additional details and examples related to the user experience in the augmented audio environment are described in the following patent applications, each of which is herein incorporated by reference in its entirety: U.S. patent application Ser. No. 16/267,643 ("Location-Based Personal Audio"); U.S. patent application Ser. No. 16/179,205 ("Spatialized Virtual Personal Assistant"); and U.S. patent application Ser. No. 16/289,940, previously incorporated by reference herein. Any of the above-noted inputs can be presented to the programmer in any format described herein, e.g., fillable text, slider, drop-down menu, pre-selects, etc. These inputs are described in further detail in terms of the user experience in U.S. patent application Ser. No. 16/289,940, previously incorporated by reference herein.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., augmented audio apps) utilizing one or more input mechanisms. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples, the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component). However, the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 9:
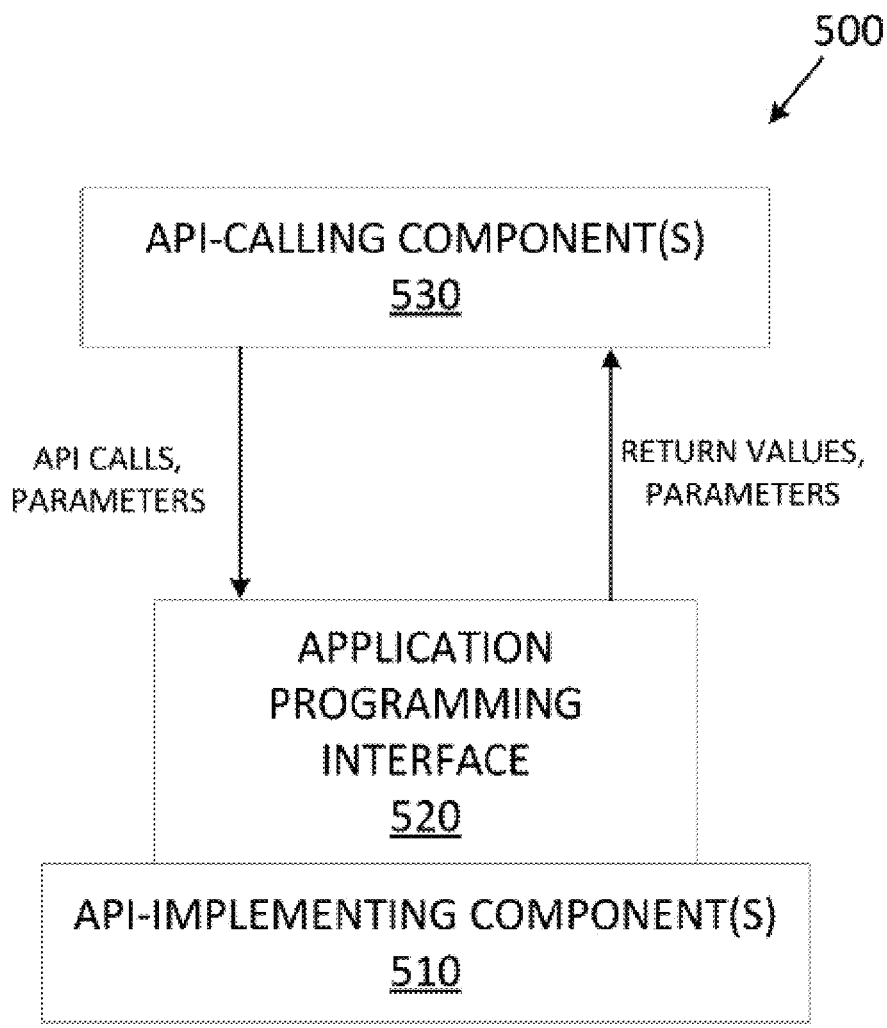
FIG. 9 is a block diagram illustrating an example API architecture used according to various implementations.

FIG. 9 is a block diagram illustrating an example API architecture, which may be used in some implementations. As shown in FIG. 9, the API architecture 500 includes the API-implementing component(s) 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component(s) 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

The API-implementing component 510 may include additional functions, methods, classes, data structures, and/or other features that are not specified through the API 520 and are not available to the API-calling component 530. The API-calling component 530 may be on the same system as the API-implementing component 510 or may be located remotely and accesses the API-implementing component 510 using the API 520 over a network. While FIG. 9 illustrates a single API-calling component 530 interacting with the API 520, other API-calling components, which may be written in different languages (or the same language) than the API-calling component 530, may use the API 520.

The API-implementing component 510, the API 520, and the API-calling component 530 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 10:
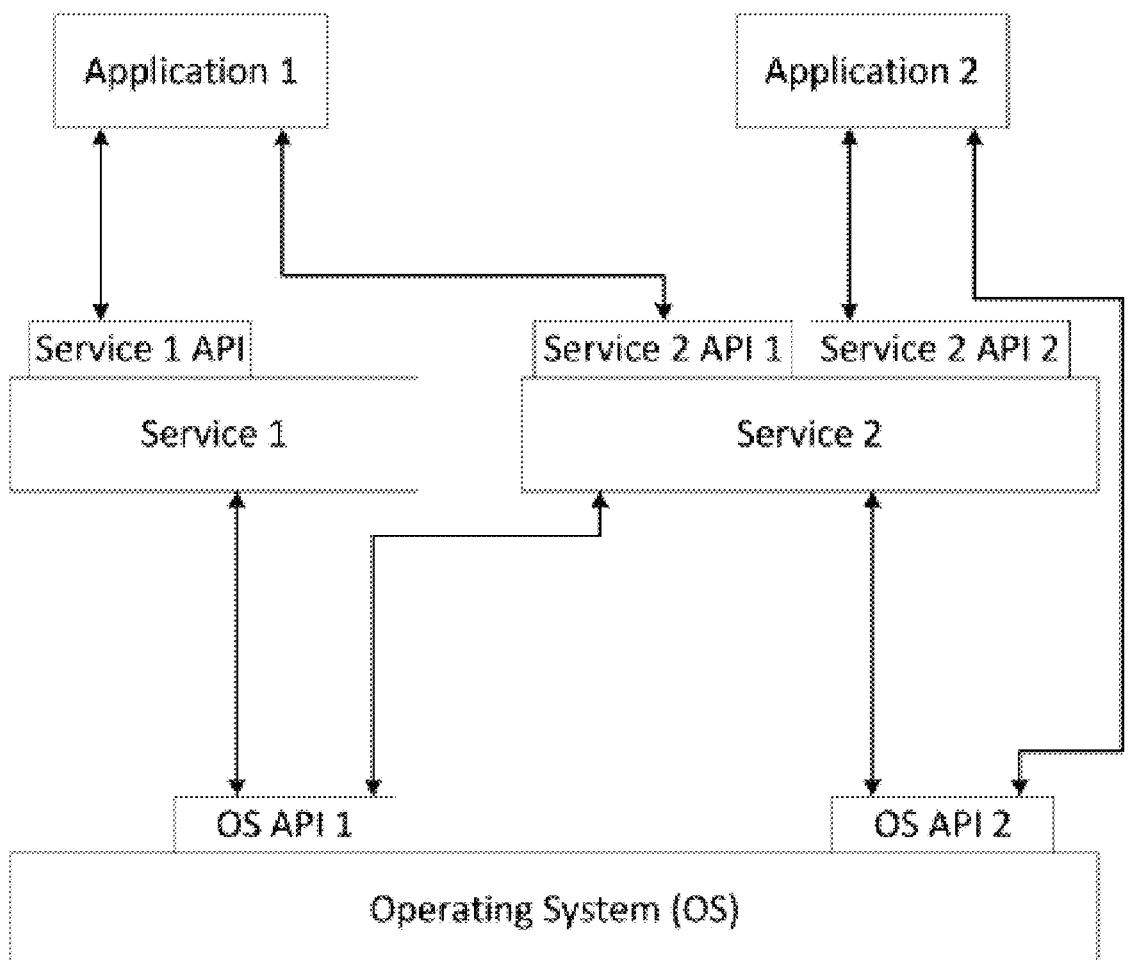
FIG. 10 is a schematic depiction of a software stack used according to various implementations.

In an example software stack shown in FIG. 10, applications can make calls to Services 1 or 2 using several Service APIs and to an Operating System (OS) using several OS APIs. Services 1 and 2 can make calls to OS using several OS APIs. In this example, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

I claim:

1. A computer-implemented method comprising:
    generating a set of inputs to an application programming interface (API) on a display, the set of inputs comprising:
        a media library input;
        an experience state input for defining a set of experiences; and
        an event toolbar input for defining transitions between the experiences,
        wherein the experience state input comprises a relative experience input comprising at least one of:
            a) a user centered experience, wherein audio is rendered in an augmented audio environment with a user as a central point regardless of movement of the user;
            b) a room scale experience, wherein audio is rendered in the augmented audio environment with adjusted dimensionality as the user moves;
            c) a distance triggered experience, wherein upon triggering, the audio is rendered in the augmented audio environment based solely upon a distance the user has traveled; or
            d) a time triggered experience, wherein upon triggering, the audio is rendered in the augmented audio environment based solely upon an elapsed time; and
    rendering the set of inputs at an audio device to generate a scene in the augmented audio environment.

2. The computer-implemented method of claim 1, wherein the media library input comprises audio content selections for playback in the scene.

3. The computer-implemented method of claim 2, wherein the experience state input comprises a triggering event input defining a triggering event for at least one of the experiences, wherein in response to the triggering event an API-calling component renders audio playback of at least one of the audio content selections.

4. The computer-implemented method of claim 3, wherein the triggering event comprises a plurality of required sub-events that are required to trigger the at least one experience.

5. The computer-implemented method of claim 1, wherein the event toolbar input comprises at least one of user interaction correlations or event class correlations with a type of augmented audio hardware providing a data input.

6. The computer-implemented method of claim 1, wherein the event toolbar input enables a user to define the type of augmented audio hardware that is configured to initiate the transition between the experiences.

7. The computer-implemented method of claim 1, wherein the media library input comprises a plurality of inputs associated with distinct types of audio content selections for rendering in the scene.

8. The computer-implemented method of claim 7, wherein the plurality of inputs comprise two or more of: voice audio content, musical audio content, ambiance audio content, or sound effect audio content, and wherein the API permits assigning the two or more inputs to distinct locations relative to the user in physical space.

9. The computer-implemented method of claim 1, wherein the experience state input is displayed in the API as a set of template experiences assignable to the scene.

10. The computer-implemented method of claim 1, wherein the media library input comprises options for assigning at least one audio file to the scene, wherein the at least one audio file comprises a spatialized audio file configured for binaural playback, a monaural audio file or a stereo audio file.

11. The computer-implemented method of claim 1, wherein the API allows an API-calling component to render audio playback at the audio device according to the set of inputs.

12. A computing device for rendering a scene in an augmented audio environment, the computing device comprising:
a display;
a processor to execute instructions; and
a memory coupled with the processor to store the instructions, which when executed by the processor, cause the processor to perform operations to generate a set of inputs to an application programming interface (API) on the display, the set of inputs comprising:
a media library input;
an experience state input; and
an event toolbar input,
wherein the media library input comprises a plurality of inputs associated with distinct types of audio content selections for rendering in the scene,
wherein the plurality of inputs comprise two or more of: voice audio content, musical audio content, ambiance audio content, or sound effect audio content, and wherein the API permits assigning the two or more inputs to distinct locations relative to the user in physical space, and
wherein the scene is rendered at an audio device based upon the set of inputs in response to user actuation.

13. The computing device of claim 12, wherein the experience state input comprises an absolute experience input for defining a geographic element in physical space,
wherein the scene is rendered in the augmented audio environment in response to user movement relative to the geographic element,
wherein the geographic element is displayed in a map workspace on the API and comprises at least one of a point, a line or a polygon, and
wherein the geographic element is actuatable in the API, and in response to actuating the geographic element, the API displays a properties dialog box indicating characteristics of the geographic element in the scene.

14. The computing device of claim 12,
wherein the experience state input comprises a triggering event input defining a triggering event for at least one of the experiences, wherein in response to the triggering event an API-calling component renders audio playback of at least one of the audio content selections, and
wherein the triggering event comprises a plurality of required sub-events that are required to trigger the at least one experience.

15. A computer-implemented method comprising:
generating a set of inputs to an application programming interface (API) on a display, the set of inputs comprising:
a media library input;
an experience state input for defining a set of experiences, wherein the experience state input comprises an absolute experience input for defining a geographic element in physical space; and
an event toolbar input for defining transitions between the experience; and
rendering the set of inputs at an audio device to generate a scene in an augmented audio environment,
wherein the scene is rendered in the augmented audio environment in response to user movement relative to the geographic element.

16. The computer-implemented method of claim 15, wherein the geographic element is displayed in a map workspace on the API and comprises at least one of a point, a line or a polygon.

17. The computer-implemented method of claim 16, wherein the geographic element is actuatable in the API, and in response to actuating the geographic element, the API displays a properties dialog box indicating characteristics of the geographic element in the scene.

* * * * *